United States Patent [19]
Enokizono et al.
[11] 4,100,025
[45] Jul. 11, 1978

[54] METHOD OF TREATING A DEXTROSE SOLUTION

[75] Inventors: Shigehiro Enokizono, Ageo; Norio Kamata, Funabashi; Sakado Kanno, Sakada, all of Japan

[73] Assignee: CPC International Inc., Englewood Cliffs, N.J.

[21] Appl. No.: 618,090

[22] Filed: Sep. 30, 1975

[30] Foreign Application Priority Data

Oct. 4, 1974 [JP] Japan ................................ 49-113998

[51] Int. Cl.[2] ........................ C13K 1/00; C13K 11/00; C13D 3/14; C12C 13/00

[52] U.S. Cl. ................................ 195/31 F; 127/46 A; 195/66 R

[58] Field of Search ........................... 195/31 F, 66 R; 127/46 A, 48, 38

[56] References Cited

U.S. PATENT DOCUMENTS

| | | | |
|---|---|---|---|
| 2,606,847 | 8/1952 | Newkirk | 27/46 A X |
| 2,994,669 | 8/1961 | Hader | 127/46 A X |
| 3,475,216 | 10/1969 | Walon | 127/46 A |
| 3,755,084 | 8/1973 | Feder | 195/66 R |
| 3,909,354 | 9/1975 | Thompson | 195/31 F |
| 3,910,821 | 10/1975 | Cory | 195/31 F |
| 3,982,997 | 9/1976 | Eaton | 195/31 F |

OTHER PUBLICATIONS

M. Natake et al., Agr. Biol. Chem., 28(8), 505-509 (1964).
D. B. McNair Scott, Nature, 212, 605-606 (1966).

*Primary Examiner*—Sidney Marantz

[57] ABSTRACT

A dextrose containing solution is treated with chelating resin capable of removing heavy metals and thereafter at least a part of the dextrose is isomerized to levulose in the presence of a dextrose isomerase enzyme preparation.

5 Claims, No Drawings

METHOD OF TREATING A DEXTROSE SOLUTION

This invention relates to the production of levulose from dextrose and more in particular it relates to the production of a greater amount of levulose from a dextrose containing solution. Dextrose containing solution, such as those made by dissolving crystalline dextrose in water may be used as the isomerization feedstock. However, it is economically advantageous to utilize as the feedstock a starch hydrolysate syrup, also referred to a starch saccharizate, which has a high dextrose content.

Starch hydrolysates having a high dextrose content are produced today by what is known as the enzyme-enzyme process. A starch slurry is digested with an alpha-amylase enzyme preparation to produce low molecular weight fragments. The resulting material is then saccharified with a glucoamylase enzyme preparation to produce the dextrose containing solution.

The solution produced in this manner contains certain impurities such as ash, color bodies, cations, ect. which are generally removed. The usual purification treatment involves passing the liquor through a series of ion exchange columns. Typical purification methods include a two column method, i.e., a strongly acidic cation exchange resin followed by a weakly basic anion exchange resin. A four column method involves a repeat treatment using the above two resins. It is also possible to follow the two column purification with a third column containing a mixture of a strongly acidic cation exchange resin and a strongly basic anion exchange resin.

It has been found that the starch saccharizate solution also contains trace amounts of various heavy metal ions. These heavy metal ions, and in particular $Zn^{++}$ and $Pb^{++}$ inhibit the effectiveness of the enzyme preparation used to isomerize the dextrose to levulose.

Dextrose is generally converted to its isomer, levulose, by the use of an enzyme preparation called glucose isomerase. This enzyme preparation is produced by a number of microorganisms known in the art.

The glucose isomerase enzyme preparations are quite expensive and it is economically important to produce the maximum quantity of levulose from each unit of enzyme. A unit of glucose isomerase (G.I.) is defined as that amount of enzyme which will produce 1 micromole of levulose per minute at 60° C and a pH of 7.5.

The effectiveness of the enzyme preparation may be measured in terms of the isomerization ratio. This is generally expressed as a percent and is calculated as:

$$(\text{levulose}/\text{levulose} \ \& \ \text{dextrose}) \times 100$$

It can be seen that the higher the isomerization ratio, the greater the levulose content of the final syrup.

The method of this invention produces a feedstock which will produce a final levulose bearing product having a greater isomerization ratio per G.I. unit of enzyme.

The production of a levulose bearing syrup is rapidly increased by the method of this invention. The industrial production of levulose is commonly carried out in the following way. Starch is liquefied with a mineral acid or with a liquefying enzyme and then is saccharified with a saccharifying enzyme. Further, 20 – 50% of dextrose contained in this saccharified solution is converted into levulose with a glucose isomerase enzyme preparation. After that, the levulose-bearing syrup may be purified and concentrated.

The isomerizing reaction by an isomerizing enzyme may be conducted industrially by the batch method of adding the microbila cells which contain glucose isomerase. Recently continuous insomerization using a fixed isomerizing enzyme prepared by having glucose isomerase immobilized on a special carrier, such as an anion exchange resin, porous glass beads, or other insoluble material capable of adsorbing or uniting with the enzyme has become the preferred method.

As the feedstock for the production of levulose, a saccharified starch solution or a water solution of purified or crystalline dextrose is used, but the material used industrially at present is mainly the starch saccharizate for economic reasons. However, when the isomerizing reaction was conducted with a certain amount of glucose isomerase, the isomerization ratio is much lower when the starch saccharizate was used as the material, than when the water solution of crystalline dextrose was used as the material. The difference is particularly remarkable in the case of the continuous isomerizing reaction conducted by using an immobilized isomerizing enzyme.

It has been found that the isomerization ratio is greatly influenced by certain impurities in the starting material. When dextrose is isomerized with glucose isomerase, if certain heavy metal ions such as zinc are present, its isomerizing power is considerably inhibited. The isomerization ratio is also influenced by the purity of the glucose isomerase used. In the case of glucose isomerase extracted from microbial cells and purified, it is influenced more easily by heavy metal ions than in the case of glucose isomerase not extracted and not purified. As the amount of heavy metal ions contained in the starch saccharizate is by far greater than that of heavy metal ions contained in the water solution of crystalline dextrose, the isomerization ratio when the starch saccharizate is used as the feedstock material is lower than that when the water solution of crystalline dextrose is used as the material feedstock.

Generally, base metal ions such as Ca derived from the starch suspending water, a liquefying enzyme and a saccharifying enzyme, various heavy metal ions such as those of Zn, Pb, Fe and Cu are present in the saccharified solution. Though base metal ions such as Na, K and Ca are removed almost completely by conventional ion exchange resin treatment, heavy metal ions are scarcely removed. Accordingly, the isomerizing reaction is inhibited by these heavy metals, and a large amount of glucose isomerase is necessarily required. These inhibitory materials may be partially removed by crystallizing the pure dextrose and redissolving it in distilled water. However, this method requires large expenses for the crystallizing process and is thus poor in practicality. Further, although the dextrose is crystallized, it is impossible to remove the above-mentioned heavy metal ions completely. The cost becomes expensive in both the method of isomerizing the starch saccharizate as it is without crystallizing the dextrose and that of conducting its isomerization after the dextrose contained has been crystallized once and again dissolved.

Any dextrose containing solution may be used in the purification process of this invention, i.e., refined or unrefined starch saccharizates, redissolved crystalline dextrose, or the various solutions, known as hydrol, remaining after crystallizing the dextrose.

It has been found that the interfering heavy metal ions may be substantially completely removed by passing the dextrose containing solution through a bed containing a chelating resin or other type resin capable of removing heavy metal ions. These include the chelating resins, complex adsorbing exchanger resins, and selectively adsorbing cation exchange resins. The terms "cation exchanger" and "cation exchange resin" will be used to describe this invention. It is understood, however, that where the context permits, all of the useful types of resins are to be included. As specific examples, for instance, there are Lewatit TP-207 (Bayer), Lewatit ATP-202 (Bayer), Dowex A-1 (Dow Chemical) and Diaion CR-10 (Mitsubishi Kasei). A chelate exchanger composed of polysaccharide skeleton, for instance, Muro chelate (Muromachi Kagaku) can also be used in this invention.

The above-mentioned conventional ion-exchange treatment is incapable of effectively removing heavy metal ions, as illustrated in Table 1.

Table 1

| | Cation ppm at Bx 50 | | | |
|---|---|---|---|---|
| | Starch hydrolyzate* | After conventional treatment | After Treatment of this invention | After both treatments |
| $Ca^{++}$ | 215 | 4.3 | 189 | 3.8 |
| $Na^{+}$ | 108 | 5.1 | 96 | 4.9 |
| $Fe^{++}$ | 1.48 | 0.42 | 0.26 | 0.21 |
| $Cu^{++}$ | 0.16 | 0.05 | 0.02 | 0.01 |
| $Pb^{++}$ | 0.79 | 0.03 | 0.03 | 0.03 |
| $Zn^{++}$ | 0.68 | 0.36 | 0.04 | 0.03 |

*D. E. 96.8, Dextrose 93.8%
**Four column purification as described above.
**Lewatit TP-207 - hydrogen form (Bayer Co.)

The inhibitory effect of the heavy metal ions may be noticed with as little as 0.1 ppm of Zn or Pb. It can be seen that the conventional treatment will not reduce the Zn ion to below this level.

In general, the useful resins of this invention are different from those resins useful for conventional treatments in terms of production method, functional groups and affinity for adsorbable ions. For example, Dowex A-1, is produced by the addition of imino diacetate to styrenedivinyl benzene polymer, and its partial structure is:

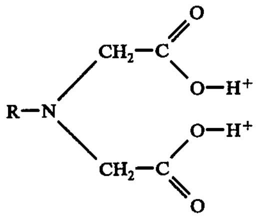

Howeverr, styrene, phenol, and metacrylic acid are used as the monomers for the production of general ion exchange resins. The functional groups are such acid radicals as $-SO_3H$, $-COOH$, $-OH$ and $-PO_2H_2$.

The cation exchanger on which heavy metals are efficiently adsorbed can be used in any form, for instance in hydrogen or salt forms. It is preferable to utilize the hydrogen form. The resin can be made into the hydrogen form by passing a mineral acid such as $H_2SO_4$ or HCl through a tower packed with the resin. It is preferred to pass a proper amount of HCl of a proper concentration. For example, twice the volume of the ion exchanger of 5% HCl may be passed to produce the hydrogen form. Further, as the conditions at this time, SV (space velocity) 2 - 10 or favorable 3 - 5, and room temperature — 70° C or favorably 20° - 50° C.

Next, when the solution containing dextrose is passed through a tower packed with the above-mentioned cation exchange resin, the heavy metals in the solution are adsorbed onto the ion-exchange resin.

In passing the dextrose containing solution through a tower packed with the above-mentioned cation exchanger, it is advantageous to pass a solution of pH 1 - 8 or preferably 3 - 6, of a concentration of 10 - 60% (weight %) or preferably 30 - 50% and at room temperature — 70° C at SV 1 - 8.

The dextrose containing solution to be used as the material contains various heavy metal ions. For instance, the starch saccharizate, purified in the usual way, contains Zn, Pb, Fe and Ca ions and their content is generally above 1 ppm (in terms of Pb). If the dextrose solution containing these heavy metal ions is passed through a tower packed with the cation exchange resin, those heavy metal ions are adsorbed onto the cation exchanger. In this case, the particular heavy metal ions adsorbed are determined by the pH of the dextrose solution. When the dextrose solution has a pH of about 3 - 6 they are mainly Zn and Pb ions. Accordingly, to remove the heavy metal ions which inhibit the isomerizing reaction, it is advantageous to adjust the pH of the dextrose solution so that those heavy metals may be removed efficiently.

When the dextrose containing solution is passed through a tower packed with the above-mentioned cation exchange resin, the heavy metal adsorbing power of the cation exchanger decreases gradually and finally becomes entirely extinct. The regeneration treatment of the cation exchanger is conducted by passing a suitable regenerant solution after stopping the passing of the solution containing dextrose at such a time when the adsorbing power of the cation exchanger has begun to drop. For instance, a mineral acid solution is passed when the cation exchanger is used in hydrogen form. By this regeneration treatment the above-mentioned cation exchanger, on which heavy metals have been adsorbed, is returned to the form prior to the passing of the solution containing dextrose. It is also advantageous to pass a proper amount (for instance, 2 bed volumes) of a mineral acid solution of a proper concentration (for instance, 5% HCl) in the case of the hydrogen form cation exchanger. At this time, the proper conditions are SV 2 - 10 or preferably 3 - 5 and room temperature — 70° C or preferably 20° - 50° C.

The dextrose containing solution which was treated with the abovementioned cation exchange resin can be used for the isomerization reaction without any further refining treatment or may be decolorized, concentrated, etc. The isomerizing reaction may be conducted by the usual batch or continuous methods.

When the dextrose containing solution is treated by this method, the heavy metal ions contained in the solution and which are harmful for the isomerizing reaction, such as zinc and lead are substantially completely removed. Therefore, a much higher isomerization ratio than in the conventional method can be obtained in the isomerizing reaction. That is to say a certain isomerization ratio can be obtained with far less glucose isomerase enzyme than is necessary when the treatment of this invention is not used. The invented method especially displays a great effect when glucose isomerase extracted from microbial cells and then purified is used in the isomerizing reaction. When the isomerizing reaction is conducted by the batch method with glucose isomerase extracted from microbial cells and purified, the isomerization ratio of the levulose produced from the dextrose containing solution treated by the invented method is about 3 times greater than that of the levulose produced from the dextrose containing solution treated by the conventional method.

Further, since the content of heavy metal ions which inhibit the isomerizing reaction in the dextrose containing solution is extremely small, it is the feature of the invented method that it is possible to treat a large amount of the solution containing dextrose before the heavy metal ion adsorbing power of the above-mentioned cation exchange resin begins to drop.

Further, by treating the solution containing dextrose by the invented method, it is possible to decrease the amount of glucose isomerase used to below the amounts used at persent for the industrial production of levulose.

As is stated above, according to this invented method, it is possible to prepare by a simple but cheap treatment, the dextrose containing solution which can be isomerized to yield levulose having a high isomerization ratio.

In order to provide a better understanding of the invention, the following exemplary and non-limiting examples are provided.

EXAMPLE 1

Corn starch was liquefied with an a-amylase liquefying enzyme, "Kleistase L-1" (produced by Daiwa Kasei Co., Japan) and saccharified with a glucoamylase saccharifying enzyme, "Sumizyme 800" (produced by Shinnihon Kagaku Co., Japan) by a conventional method. The saccharizates obtained were filtered on a filter paper using diatomaceous earth as filter aid under reduced pressure.

The filtered saccharizate was purifed in the usual way: the liquor was successively passed through (1) a single bed resin column packed with 1000 ml of a strongly acidic cation exchange resin, IR-120B (manufactured by Tokyo Yukikagaku Kogyo Co., Japan) which had been regenerated with hydrochloric acid, (2) a single bed resin column packed with 1200 ml of a weakly basic anion exchange resin, IRA-93 (manufactured by Tokyo Yukikagaku Kogyo Co., Japan) which had been regenerated with sodium hydroxide, and (3) a mixed bed resin column packed with 150 ml of a strongly acidic resin, Amberlite-200 (manufactured by Tokyo Yukikagaku Kogyo Co., Japan) which had been regenerated with hydrochloric acid, and 300 ml of a strongly basic anion exchange resin, IRA-411 (manufactured by Tokyo Yukikagaku Kogyo Co., Japan) which had been regenerated with sodium hydroxide.

The purified saccharizate was then concentrated. The quality of the purified saccharizate, so obtained, was as follows:

Sugar Concentration: 51.2 (Bx)
DE: 95.7
Dextrose: 93.2 (%)
Color Value (OD at 427 mu): 0.018 (1 cm light path)
Total Salts: 60.3 ppm (as $CaCO_3$)
pH: 5.4

The heavy metal ions in this liquor were determined by the chelate titration method and found to be 1.6 ppm as zinc ion.

Then, 10 liters of the purified saccharizate were further treated with a chelating resin, Lewatit TP-207 (manufactured by Bayer Co., West Germany). 50 ml of the resin was packed in a glass column (height: 25 cm, diameter: 2.1 cm) and the resin was regenerated by passing 200 ml of 10% hydrochloric acid through a column at 30° C at a flow rate of 5 bed volumes per hour, followed by washing with 1000 ml of deionized water. Then, the purified saccharizate was passed through this column by the descending method at 30° C and a flow rate of 5 bed volumes per hour.

The quality of this chelate resin treated liquor was as follows:

Sugar Concentration: 51.2 (Bx)
DE: 95.7
Dextrose: 93.2 (%)
Color Value (OD at 420 mu): 0.016 (1 cm light path)
Total Salts: 59.9 ppm (as $CaCO_3$)
pH: 3.1

The heavy metals contained in this chelate resin treated liquor were determined by the above-mentioned method and no heavy metal ions were detected. Next, this chelate resin treated liquor was isomerized by the batch method. That is to 5 liters of this chelate resin treated dextrose liquor, 5 g of $MgCl_2.6H_2O$ were added and stirred, the pH of the mixture being adjusted to 6.5 with sodium hydroxide. To this mixture, a glucose isomerase solution was added, at a dosage of 2 units per gram of dextrose contained in the mixture. Glucose isomerase was extracted from *Streptomyces olivochromogenes,* a microorganism producing glucose isomerase in the following way: *St. olivochromogenes* was cultured in a liquid medium for about 50 hours and the cultured cells were separated from the culture medium by centrifugation. The cells obtained were digested with lysozyme. Centrifugation of the cell digest gave a supernatent liquid containing glucose isomerase. Isopropanol was added to the supernatant liquid to precipitate the enzyme. The precipitates obtained on centrifugation of the solution were redissolved in water containing $MgCl_2$ and used as the isomerizing enzyme preparation. The isomerization reaction was continued for 48 hours in a 15 liter reactor equipped with a heater and stirrer while the saccharified solution was stirred slowly. During the reaction, the pH was adjusted with a 5% $NaHCO_3$ solution so that it remained between 6.3 and 6.7. After 48 hours of isomerization the isomerization rate was found to be 43.2%.

For comparison, the concentrated purified saccharizate not treated with the above-mentioned chelating resin was isomerized under the same conditions as above. The isomerization rate was found to be 19.2% after 48 hours.

EXAMPLE 2

50 liters of the concentrated purified saccharizates were prepared by the same method as described in Example 1. This liquor was passed at a flow rate of 5 bed volumes per hour at 30° C by the descending method through a jacketed glass column (height: 50 cm, diameter: 3 cm) packed with 250 ml of a selectively adsorbing resin, Lewatit ATP-202 (manufactured by Bayer Co., West Germany) which had been regenerated with 1 liter of 10% hydrochloric acid by passing it through the glass column at a flow rate of 5 bed volumes per hour at 30° C, followed by washing with 5 liters of deionized water. No heavy metal ions were detected in this selectively adsorbing resin treated liquor when it was determined by the chelate titration method.

The continuous isomerization was carried out using the ATP-202 resin treated liquor, as a feed, to which 1 gram of $MgCl_2.6H_2O$ had been added per 1 liter of the liquor prior to isomerization. That is, the above-mentioned feed, of which after the pH had been adjusted to 8.5 with sodium hydroxide, was passed by the descending method at a feed supply rate of 2 bed volumes per hour through a jacketed glass tube (height: 12 cm, diameter: 2.1 cm). The tube had been packed with 15 ml of a strongly basic anion exchange resin, Amberlite IRA-904 (manufactured by Tokyo Yukikagaku Kogyo Co., Japan) on which 200 units of glucose isomerase, prepared by the method described in Example 1, had been adsorbed per 1 ml of resin. The glass column containing the resin was kept at 60° C by circulating hot water through the jacket. Changes in the isomerization ratio of the isomerized liqour during the continuous isomerization were as follows:

Table 2

| Operation Time (days) | 1 | 5 | 10 | 15 | 20 | 25 | 30 |
|---|---|---|---|---|---|---|---|
| Isomerization Ratio (%) | 49.1 | 48.5 | 45.2 | 40.6 | 34.3 | 29.3 | 23.6 |

For comparison, the continuous isomerization was carried out using, as a feed, the purified saccharizates not treated with Lewatit ATP-202 resin. One gram of $MgCl_2.6H_2O$ was added per liter of liquor prior to isomerization. The pH of this feed was adjusted to 8.5 with sodium hydroxide. Continuous isomerization was carried out under the same conditions as described above. In this case, the isomerization rate changed in the following way:

Table 3

| Operation Time (days) | 1 | 5 | 10 | 15 |
|---|---|---|---|---|
| Isomerization Ratio (%) | 42.7 | 28.9 | 19.3 | 14.6 |

EXAMPLE 3

30 Kg of anhydrous crystalline dextrose was dissolved in 30 liters of deionized water to make 50 liters of dextrose solution. The quality of this liquor was as follows:

Sugar Concentration: 51.2 (Bx)
Dextrose: 99.8 (%)
pH: 4.5
Heavy Metals: Not detected This dextrose liquor was treated with a chelate resin, Lewatit TP-207 (manufactured by Bayer Co., West Germany). The liquor was passed at a flow rate of 5 bed volumes per hour at 30° C by the descending method through a jacketed glass column (height: 50 cm, diameter: 3 cm) packed with 250 ml of Lewatit TP-207 resin which had been regenerated by passing 1 liter of 10% hydrochloric acid through the glass column at a flow rate of 5 bed volumes per hour at 30° C, followed by washing with 5 liters of deionized water. The quality of this chelate resin treated dextrose liquor was as follows:

Sugar Concentration: 51.2 (Bx)
Dextrose: 99.8 (%)
pH: 3.7
Heavy Metals: Not detected The continuous isomerization was carried out using, as a feedstock, this TP-207 resin treated liquor to which 1 gram of $MgCl_2.6H_2O$ had been added per liter of the liquor prior to isomerization. That is, the feedstock after the pH had been adjusted to 8.5 with sodium hydroxide, was passed by the descending method at a constant feed supply rate of 2 bed volumes per hour through a glass column (height: 12 cm, diameter: 2.1 cm). The column was packed with 15 ml of a strongly basic anion exchange resin, Amberlite IRA-904 (manufactured by Tokyo Yukikagaku Kogyo Co., Japan) on which 230 units of glucose isomerase, prepared by the method described in Example 1, had been adsorbed per 1 ml of IRA-904 resin. The IRA-904 containing glass column was kept at 60° C by circulating hot water through the jacket of the glass tube. During this continuous isomerization, changes in the isomerization ratio were as follows:

Table 4

| Operation Time (days) | 1 | 10 | 20 | 30 | 40 | 50 |
|---|---|---|---|---|---|---|
| Isomerization Ratio (%) | 51.1 | 50.3 | 45.8 | 38.4 | 30.7 | 22.4 |

For comparison, crystalline dextrose liquor not treated with Lewatit TP-207 resin was used as a feedstock for continuous isomerization, after the liqour was adjusted to the same magnesium ion level and pH. The other conditions of this continuous isomerization were the same as those described above. The changes in the isomerization ratio were as follows:

Table 5

| Operation Time (days) | 1 | 10 | 20 | 30 | 40 | 50 |
|---|---|---|---|---|---|---|
| Isomerization Ratio (%) | 51.1 | 47.4 | 42.0 | 34.1 | 23.9 | 12.6 |

EXAMPLE 4

A starch saccharizate was obtained by a conventional enzyme method. Corn starch was hydrolyzed by a commercial a-amylase liquefying enzyme, Kleistase L-1 (a trademark of Daiwa Kasei Co., Japan) and the hydrolyzates were saccharified by a commercial glucoamylase saccharifying enzyme, Sumizyme 800 (a trademark of Shinnihon Kagaku Co., Japan). This saccharizate obtained was filtered and then concentrated. Re-filtration of the concentrated saccharizate gave 50 liters of a concentrated saccharizate liquor. The quality of this liquor was as follows:

Sugar Concentration: 49.8 (Bx)
DE: 95.6
Dextrose Content: 93.1 (%)
Color Value (OD at 420 mu): 0.13 (at cm light path)
Total Salts: 946 ppm (as $CaCO_3$)
pH: 4.8
Heavy Metals: 1.8 ppm (as Zn)

This liquor was treated with a chelate resin, Lewatit TP-207 as described in Example 3. The quality of the TP-207 resin treated liquor was as follows:

Sugar Concentration: 59.8 (Bx)
DE: 95.6
Dextrose: 93.1 (%)
Color Value (OD at 420 mu): 0.09 (1 cm light path)
Total Salts: 950 ppm (as $CaCO_3$)
pH: 3.6
Heavy Metals: Not detected To this TP-207 treated liquor, 1 gram of $MgCl_2.6H_2O$ per liter of the liqour was added and the pH was adjusted to 8.5 with sodium hydroxide. It was then used as a feed in continuous isomerization. The continuous isomerization was conducted in the way described in Example 3. Changes in the isomerization ratio during this continuous isomerization were as follows:

Table 6

| Operation Time (days) | 1 | 5 | 10 | 15 | 20 | 25 | 30 |
|---|---|---|---|---|---|---|---|
| Isomerization Ratio (%) | 49.0 | 47.6 | 44.2 | 37.7 | 31.4 | 23.0 | 15.1 |

For comparison, the concentrated saccharizate liquor not treated with the TP-207 resin was used as a feed at the same Mg and pH level and the isomerization was carried out under the same conditions. Changes in isomerization ratio were as follows:

Table 7

| Operation Time (days) | 1 | 2 | 3 | 4 | 5 |
|---|---|---|---|---|---|
| Isomerization Ratio (%) | 41.3 | 32.2 | 25.3 | 18.0 | 12.3 |

While the invention has been described in connection with specific embodiments thereof, it will be understood that it is capable of further modifications, and this application is intended to cover any variations, used, or adaptions of the invention following, in general, the principles of the invention including such departures from the present disclosure as come within known and customary practice in the art to which the invention pertains, and as may be applied to the essential features hereinbefore set forth, and as fall within the scope of the invention.

We claim:

1. A method for the removal of heavy metal ions from a dextrose containing solution comprising passing said solution through a bed of a selectively adsorbing chelating resin or a selectively adsorbing complex adsorbing exchange resin capable of binding said heavy metal ions.

2. A method in accordance with claim 1, wherein the dextrose containing solution is a starch saccharizate.

3. A continuous method for the enzymatic isomerization of dextrose to levulose comprising:

(a) passing a solution containing dextrose through a first bed containing a selectively adsorbing chelating resin or a selectively adsorbing complex adsorbing exchange resin to selectively remove heavy metal ions from said solution; and, (b) passing the resulting solution through a second bed comprising a dextrose isomerase enzyme preparation.

4. A method in accordance with claim 3, wherein said dextrose isomerase enzyme preparation is immobilized on a substrate.

5. A method in accordance with claim 3, wherein the dextrose containing solution is a starch saccharizate.

* * * * *